United States Patent

Bailey et al.

[11] Patent Number: 4,580,090
[45] Date of Patent: Apr. 1, 1986

[54] MAXIMUM POWER TRACKER

[75] Inventors: William L. Bailey, Phoenix; Robert J. Haver, Tempe, both of Ariz.

[73] Assignee: Motorola, Inc., Schaumburg, Ill.

[21] Appl. No.: 532,865

[22] Filed: Sep. 16, 1983

[51] Int. Cl.$^4$ .............................................. G05F 5/00
[52] U.S. Cl. .................... 323/303; 323/282; 323/906
[58] Field of Search ............... 323/282, 284, 285, 299, 323/303, 366, 906, 272; 320/13

[56] References Cited

U.S. PATENT DOCUMENTS

| | | | |
|---|---|---|---|
| 2,769,092 | 10/1956 | Pruitt | 323/369 |
| 3,435,328 | 3/1969 | Allen | 323/906 |
| 3,566,143 | 2/1971 | Paine | 323/906 |
| 3,696,286 | 10/1972 | Vie | 323/906 |
| 3,896,368 | 7/1975 | Rym | 323/906 |
| 4,017,789 | 4/1977 | Morris | 323/285 |
| 4,412,347 | 10/1983 | Lipcon | 323/281 |
| 4,415,960 | 11/1983 | Clark, Jr. | 363/56 |
| 4,468,569 | 8/1984 | Norris | 323/299 |

FOREIGN PATENT DOCUMENTS 56-2021  10/1981  Japan .................................. 323/288

*Primary Examiner*—Patrick R. Salce
*Assistant Examiner*—Judson H. Jones

[57] ABSTRACT

A buck regulator or impedance converter is disclosed for operating a current limited power supply such as a photovoltaic array at or near its maximum power point. The maximum power point for such a supply is achieved at the compliance voltage which is an almost constant voltage. Means are provided for sensing the voltage at the input of the regulator and for using this sensed voltage to control a logic circuit which, in turn, controls the duty cycle of a switching transistor. The output from the switching transistor is coupled to an LC filter and from there to the load. The logic circuitry, responsive to the sensed voltage, controls the duty cycle of the switching transistor in such a manner as to maintain the input voltage approximately constant and thus to maintain the power supply at or near its peak power operating point.

12 Claims, 6 Drawing Figures

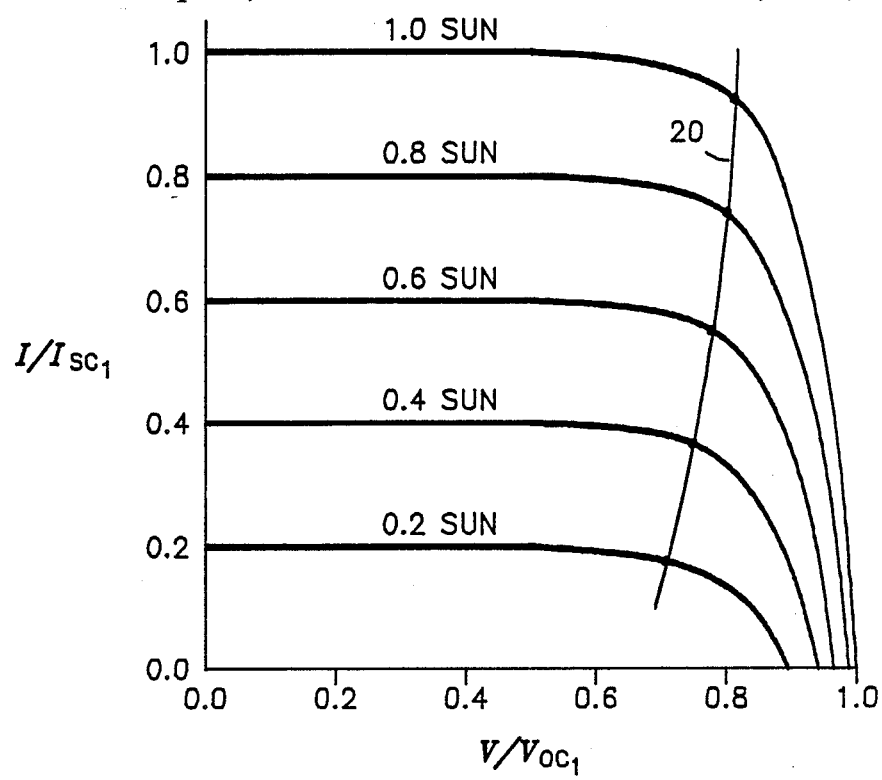
*FIG. 1*
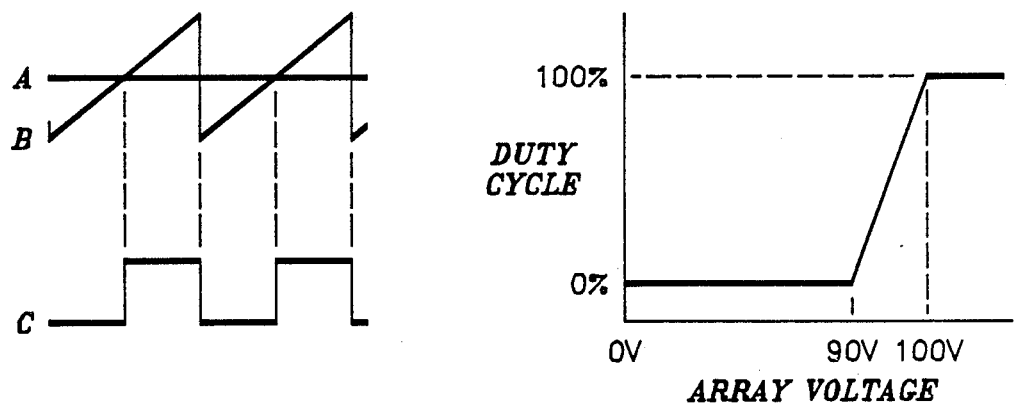
*FIG. 3*
*FIG. 4*

MAXIMUM POWER TRACKER

BACKGROUND OF THE INVENTION

This invention relates generally to an impedance converter, and more specifically to a maximum power tracker for use with current limited power supplies.

In matching a power supply to a load, it is conventional to have some form of transformer or impedance converter to optimize the match as either load or source changes. The impedance conversion is usually done with a view toward maximizing the power supplied by the source and made available to the load. One such maximum power tracker operates by sensing the voltage and current at either the load or source, recording the power, then moving the operating point a small amount and comparing the power at the new setting with the previous value. If the power measured at the new setting is larger, the operating point is moved again, in the same direction, and a new comparison is made. This process is repeated until the power value at the newest operating point is lower than the immediately previous value. The operating point is then moved in the opposite direction until the power drops again. There is thus a continued "hunting" of the operating point, even if both source and load are constant, as the logic within the power tracker hunts for the optimum operating point. This type of power tracker or impedance converter requires A/D conversion, multiplication, memory, comparison logic, and current and voltage sensors. The necessity for all of these components dictates an expensive and complicated system.

Regardless of the expense, however, there is a very serious need for power trackers. One example in which a maximum power tracker is very necessary is the running of electric motors such as in water pumping from deep wells with volumetric pumps using a photovoltaic array as a power source. Early in the day when the solar energy available to the array is low, and thus the current from the array is also low, there may not be enough current available, in the absence of some matching between load and source, to start the motor. Accordingly, some impedance matching is necessary which maintains the array near its maximum power output point and yet satisfies the drive needs of the motor. As the sun rises and the energy available to the array increases, thereby increasing the current supplied by the array, the power tracker should maintain the array at or near its maximum power output point.

A need therefore existed for an impedance transformer which would maintain the power source at or near its maximum power output while avoiding the expense, problems, and complexity of the prior art solutions.

It is therefore an object of this invention to provide an improved impedance converter which will maintain a power supply, over its useful operating range, at or near its maximum power output.

It is another object of this invention to provide an improved power tracker for use with a current limited power supply.

It is a further object of this invention to provide an improved and simplified impedance converter.

It is a still further object of this invention to provide an improved power tracker circuit for use with a photovoltaic array.

BRIEF SUMMARY OF THE INVENTION

The foregoing and other objects and advantages of the invention are achieved through the use of a buck regulator used to transfer the power available from the source, at a value close to its optimum, to a varying load. For a current limited power supply such as a photovoltaic array, the maximum power point is at the compliance voltage which is nearly constant. In accordance with the invention, the value of the supply voltage is monitored and linear feedback is used to maintain the array at or near the maximum power point voltage. The buck regulator includes a switching device coupled between the input and output. A control circuit, responsive to the voltage sensed at the supply, controls the switching device and maintains the supply voltage substantially constant by reducing the duty cycle of the switching device whenever the load demands more power than is presently available from the source and vice versa.

BRIEF DESCRIPTION OF THE DRAWINGS

FIG. 1 illustrates typical I/V characteristics and the maximum power points for a photovoltaic array as a function of solar energy incidence;

FIG. 3 illustrates waveforms generated by the control circuit;

FIG. 4 illustrates duty cycle as a function of supply voltage;

DETAILED DESCRIPTION OF PREFERRED EMBODIMENTS

The use of a power tracker, in accordance with the invention, to provide an optimal match between power supply and load is particularly applicable when the power supply is a current limited supply such as a photovoltaic array. It is not intended, however, that the invention be limited to single photovoltaic array applications. Other applications include, for example, the use with multiple photovoltaic arrays in combination driving a single load, as well as use with other current limited supplies such as the alternator of an automobile.

The output power available from a typical photovoltaic array is illustrated in FIG. 1. The current, normalized to the short circuit current $I_{sc}$, and voltage, normalized to the open circuit voltage $V_{oc}$, are plotted as a function of available energy from one sun (100 mw/cm$^2$) to 0.2 suns (20 mw/cm$^2$). The maximum power available from the array is found by the locus of points lying along line 20. The power output will shift as a function of temperature, but at any given temperature the maximum power point voltage is approximately constant. The deviation from the substantial constancy of the maximum power point voltage at lower intensities is not important because, on a clear day, the energy available below about 0.2 suns intensity is only about 2% of the total energy available. A power tracker, operating with such a photovoltaic array, maintains the array near its maximum power output by operating the supply at a voltage substantially equal to the maximum power point voltage. If the varying load, such as a motor, requires a higher current than is then directly available from the source, the regulator (or impedance converter) automatically decreases the load voltages and increases the load current so that the proper impedance transformation is made to keep the source operating at or near its maximum power point. If the load requires less current than is then directly available from the source, the converter continues to supply the maximum (or compliance) voltage of the source to the load.

Figure 2:
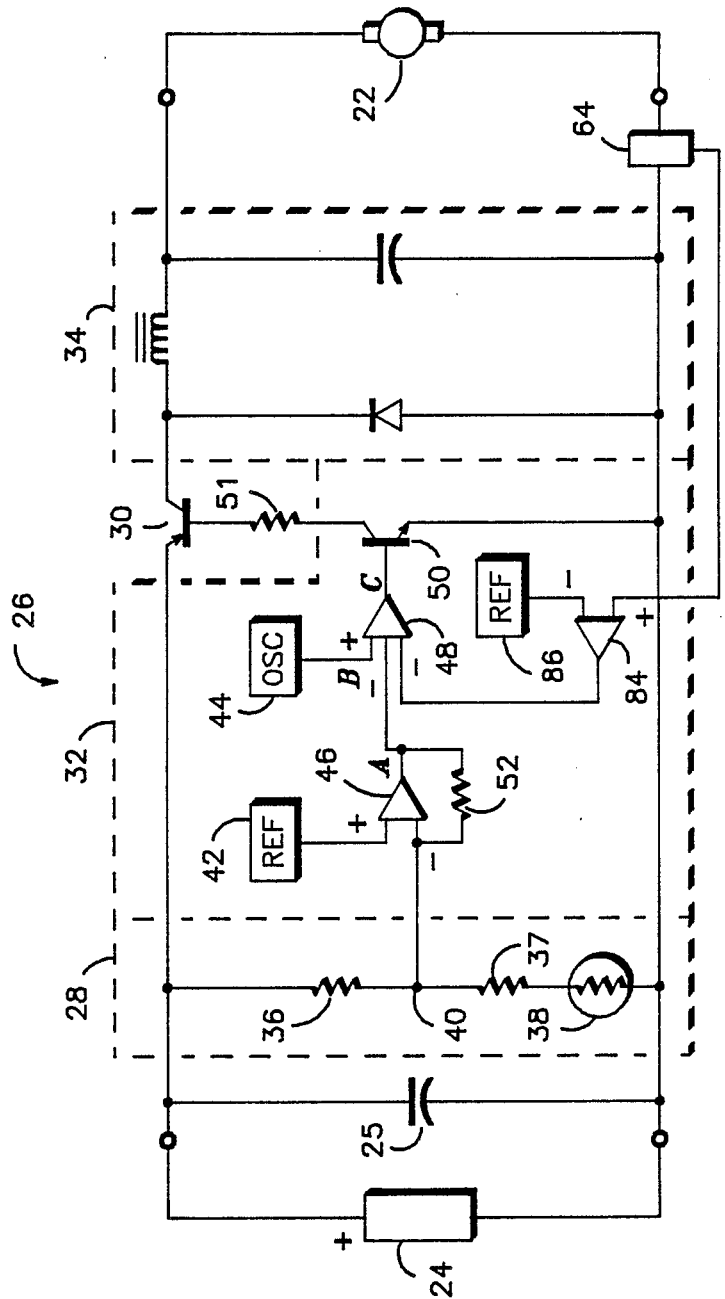
FIG. 2 illustrates, in a simplified schematic diagram, a maximum power tracker circuit in accordance with the invention.

One illustrative application in which the power tracker, in accordance with the invention, is particularly suited is in the use of a photovoltaic array to supply energy to operate a volumetric pump for pumping water from a deep well with no battery storage. A power tracker for use in such an application is illustrated in FIG. 2. In this illustration a 90 volt DC motor 22 having a ¼ horsepower rating is powered by an array 24 of seven 40 watt photovoltaic modules in series. The motor normally requires an input of about 250 watts at 90 volts DC. Under normal operating conditions, each module in the array will be operating at about 13 volts, or just below the maximum power point voltage. The power tracker 26 includes voltage sensing means 28, switching device 30, control circuit 32 for controlling the duty cycle of switching device 30 in response to the detected voltage, and a filter 34. Voltage sensing means 28 detects the voltage supplied by photovoltaic array 24 to the input of the power tracker. In this embodiment the voltage detector comprises a voltage divider having resistors 36 and 37 in series across the input of the tracker. The use of a voltage divider has the advantage that a change in the number of modules used in array 24 can be accommodated by a change in resistor 36. The tracker is thus easily field selectable to accommodate required changes in the power supply. The voltage sensing means may also include a thermistor 38 in series with resistor 37 to temperature compensate the power tracker as more fully discussed below.

The output of the voltage divider at node 40 is coupled to control circuit 32. Control circuit 32 includes a voltage reference source 42, oscillator 44, operational amplifier 46, comparator 48, output drive transistor 50 and resistor 52. The comparator and oscillator function as a pulse width modulator. Waveforms generated in control circuit 32 are illustrated in FIG. 3. With inputs from voltage reference 42 and node 40, operational amplifier 46 generates a control voltage A responsive to the voltage detected at the input of the power tracker. Oscillator 44 generates, for example, a sawtooth signal B having a frequency of about 10 KHz. The output from oscillator 44 and the control voltage A are used as inputs to comparator 48 to generate a square wave C. The duty cycle of square wave C varies in response to the input voltage detected by voltage detector 28. The output of the pulse width modulator is supplied to switching device 30 through drive transistor 50 and a current limiting resistor 51.

Switching device 30 is here illustrated as a PNP transistor, but other switching devices such as NPN transistors, FETs, and the like can also be used. Other switching means will require, of course, appropriate changes in the drive circuitry, polarity of signals, and the like.

With reference to FIG. 3, note that as the input voltage to the power tracker increases, control voltage A decreases and the pulse width of square wave signal C increases. This is illustrated by superimposing control voltage A on sawtooth signal B. An increase in pulse width of signal C increases the duty cycle of switching device 30. Filter 34 is an LC averaging filter which smooths the signal from transistor 30 and presents an essentially DC voltage at the output of power tracker 26. An increase in the duty cycle of switching device 30 causes the level of DC voltage at the output to increase; a decrease in the duty cycle causes a decrease in the output voltage.

The resultant duty cycle as a function of array voltage is illustrated in FIG. 4. In this particular embodiment, the duty cycle is essentially zero until the array voltage rises to 90 volts. The duty cycle increases linearly from 0 percent to 100 percent as the array voltage increases from 90 volts to 100 volts. The slope of this portion of the response curve is determined by feedback element 52. The transition point at which the duty cycle begins to increase from 0 percent is determined by the ratio of the resistors 36 and 37.

In a preferred mode the power tracker includes a current sense 64 in the output circuit. If the current sensed in the output rises above some predetermined value, such as if a short occurs in the motor or the motor stalls, a feedback signal is generated and fed back to comparator 48 to override the duty cycle and to provide current limiting protection for the short circuit or overload conditions. One circuit for implementing the feedback and override function is illustrated in FIG. 2. A signal from current sense 64 is used as an input to a comparator 84. A second voltage reference 86 provides a second input to comparator 84. When the signal from current sense 64 exceeds the reference voltage, a signal is provided to a second negative input of comparator 48. This second signal to comparator 48 decreases the duty cycle of output square wave C.

The reference voltage 42 and oscillator 44 can be set arbitrarily. The ratio of resistors 36 and 37 must be determined commensurate with the value selected for the reference voltage. In one embodiment of the circuit, components 42, 44, 46, 48, 50, 84 and 86 can be found in a single integrated circuit such as an MC 34060P made and sold by Motorola, Inc.

The power tracker preferably also includes a capacitor 25 coupled across the input. This capacitor is used for smoothing and is especially useful with current limited supplies.

The I/V curves illustrated in FIG. 1 change with temperature. The power tracker can be temperature compensated by using a thermistor 38 in voltage detector 28. Thus as temperature changes causing a shift in the I/V characteristics of the photovoltaic array, the ratio of resistors in the resistive divider also changes to cause the voltage available at node 40 to be temperature compensated and thus compatible with the substantially constant voltage of voltage reference 42.

Figure 5:
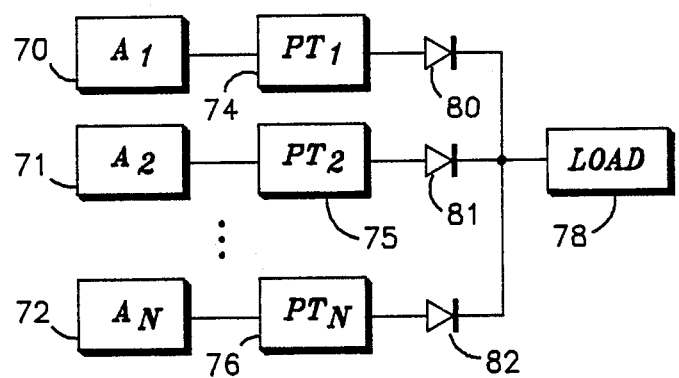
FIG. 5 illustrates the use of the power tracker in combining multiple arrays to power a single load.

Use of the power tracker, in accordance with the invention, allows the paralleling of arrays and associated trackers for higher power applications. FIG. 5 illustrates such a use of multiple arrays to power a single load. Each of a plurality of arrays 70, 71, 72 is coupled to a power tracker 74, 75, 76, respectively. The combinations of arrays with power trackers are then paralleled to power a load 78. Blocking diodes 80, 81, 82, as used in many paralleling applications, isolate the individual arrays and power trackers.

Figure 6:
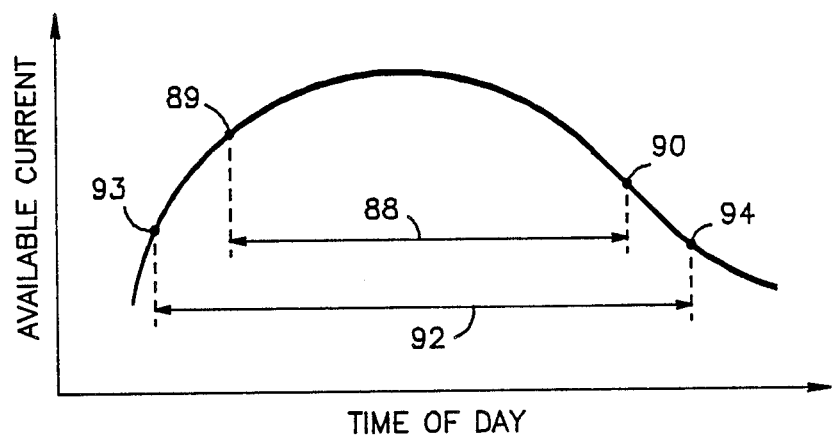
FIG. 6 schematically illustrates the useful power available from a photovoltaic array as a function of the time of day.

FIG. 6 illustrates the power available from a photovoltaic array as a function of the time of day during a clear day. The available power is low in the early morning hours, increases to a maximum near mid-day, and then decreases to a low value late in the day. Without an impedance converter such as the power tracker in accordance with the invention, the photovoltaic array directly feeding a pump motor would be able to run that motor only during a limited time of day indicated by line 88. The motor would not start until the available power reached a value such as that indicated at 89, and the motor would not be able to continue running after the available power fell below a value such as that indicated at 90. Using a power tracker in accordance with the invention, however, the pump motor will run for an extended length of time as indicated by line 92. Using the power tracker, the motor is able to start when the available energy reaches the value indicated at 93 and continues to run until the available power falls to a value lower than that indicated at 94. The power tracker is even more effective on overcast days when solar insolation is limited.

Thus, it is apparent that there has been provided, in accordance with the invention, an impedance converter which fully meets the objects and advantages set forth above. While the invention has been described and illustrated with reference to specific embodiments thereof, it is not intended that the invention be so limited. Those skilled in the art, after review of the foregoing detailed description, will realize that certain variations and modifications differing from the illustrative embodiments are possible. Such variations and modifications, for example, include other means for implementing the exact function of the control circuit as well as other applications for the power tracker. Accordingly, it is intended that all such variations and modifications as fall within the spirit and scope of the invention be included within the appended claims.

We claim:

1. An impedance converter for use with a current limited electrical supply which comprises:
    an input for coupling to said supply;
    an output for coupling to a load;
    switching means coupling said input and said output;
    voltage sensing means for detecting voltage at said input;
    circuit means responsive only to said voltage sensing means for controlling said switching means and for maintaining said voltage at said input substantially constant; and
    filter means coupled across said output.

2. The impedance converter of claim 1 wherein said voltage sensing means comprises a voltage divider including first and second resistors in series across said input and having a common node therebetween.

3. The impedance converter of claim 2 wherein said circuit means comprises an operational amplifier and a reference voltage wherein said operational amplifier generates a control voltage responsive to inputs from said reference voltage and voltage at said common node.

4. The impedance converter of claim 3 wherein said circuit means further comprises a comparator and an oscillator wherein said comparator generates a square wave having a duty cycle responsive to said control voltage and the output of said oscillator.

5. The impedance converter of claim 4 wherein said square wave generated by said comparator is coupled to said switching means to control the duty cycle thereof.

6. The impedance converter of claim 5 further comprising current sense means for detecting current flowing in said output; signal generator means for generating a feedback signal responsive to said current sense means; and feedback means for coupling said feedback signal to said comparator to selectively override said square wave.

7. The impedance converter of claim 2 further comprising a thermistor in series with said second resistor to temperature compensate said voltage sensing means.

8. The impedance converter of claim 1 wherein said filter comprises an LC averaging filter.

9. The impedance converter of claim 1 wherein said switching means comprises a PNP transistor.

10. The impedance converter of claim 1 further comprising a capacitor coupled across said input.

11. Power supply means for powering a load which comprises: a photovoltaic array; a power tracker coupled across said array; output terminals from said power tracker for coupling to said load; wherein said power tracker comprises switching means coupling said array and said output, voltage sense means for detecting voltage level supplied by said array, and circuit means responsive only to said voltage sense means for controlling said switching means and for maintaining said voltage level substantially constant.

12. A photovoltaic power supply which comprises: a plurality of photovoltaic arrays; and a plurality of power trackers, each having an input, an output, and a switching device coupling said input and said output, and each power tracker having one of said plurality of photovoltaic arrays coupled to said input, said outputs coupled in parallel, each of said power trackers characterized by means interacting with said switching device for maintaining said photovoltaic array coupled to said input substantially at the maximum power point of said array and further characterized by current sense means for detecting current flowing in said output, signal generator means for generating a feedback signal responsive to said current sense means, and feedback means for coupling said feedback signal and overriding said means interacting with said switching device.

* * * * *